No. 729,276. PATENTED MAY 26, 1903.
A. E. CAUGHEY.
ELECTRIC SIGNAL.
APPLICATION FILED FEB. 11, 1902.
NO MODEL.
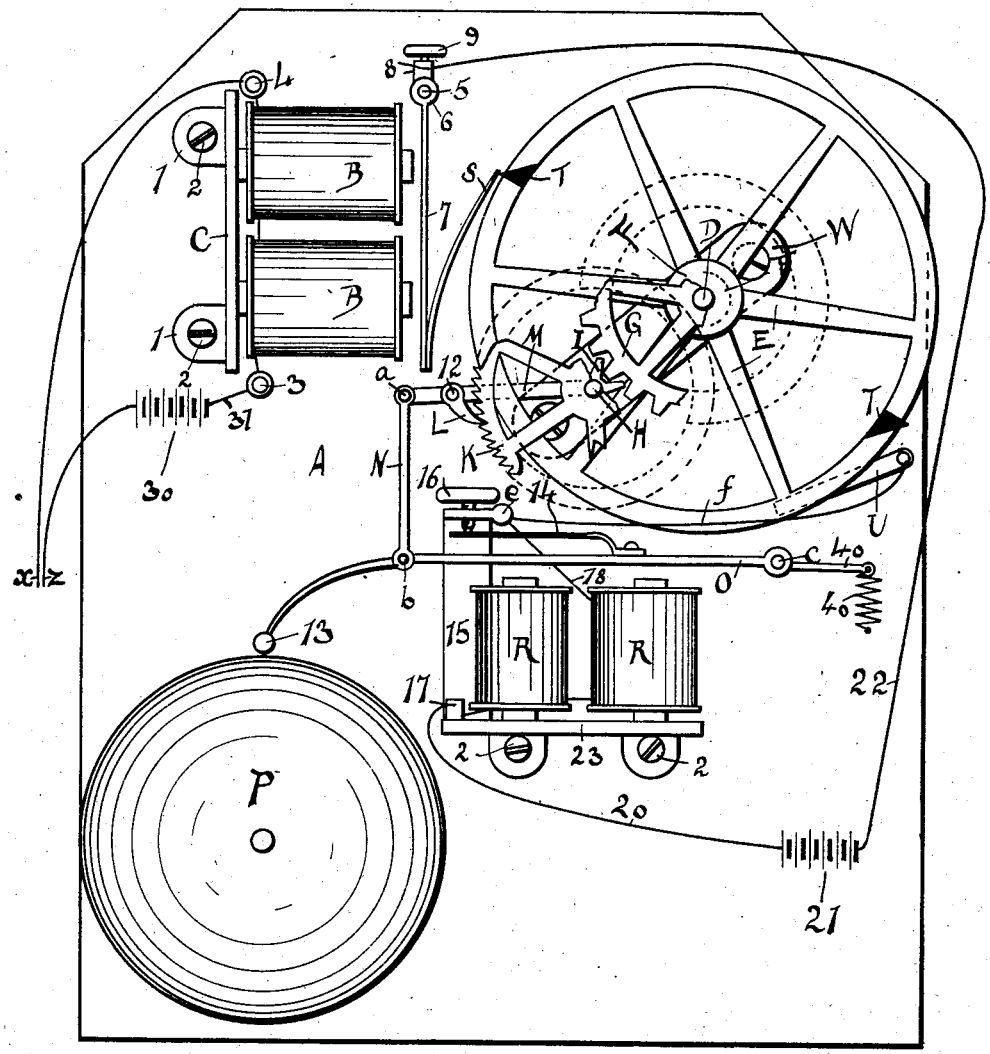
Witnesses:
F. J. Larson.
E. B. Maystrick.
Inventor:
Albert E. Caughey.
by Geo. W. Sues
atty.

No. 729,276. Patented May 26, 1903.

UNITED STATES PATENT OFFICE.

ALBERT E. CAUGHEY, OF OMAHA, NEBRASKA, ASSIGNOR OF ONE-HALF TO J. E. HOLLENBECK, OF POTTAWATTAMIE COUNTY, IOWA.

ELECTRIC SIGNAL.

SPECIFICATION forming part of Letters Patent No. 729,276, dated May 26, 1903.

Application filed February 11, 1902. Serial No. 93,511. (No model.)

*To all whom it may concern:*

Be it known that I, ALBERT E. CAUGHEY, residing at 2541 Davenport street, Omaha, in the county of Douglas and State of Nebraska, have invented certain useful Improvements in Electric Signals; and I do hereby declare that the following is a full, clear, and exact description thereof, such as will enable others skilled in the art to which it appertains to make and use the same, reference being had to the accompanying drawing, which forms a part of this specification.

This invention relates to a new and novel improvement in electric signals.

The object of my invention is to provide a signal adapted to be placed at suitable street and railroad crossings to be operated in connection with a track device to indicate the approach of a car or a train.

In the accompanying drawing I have shown a view, with portions removed, of an electric signal embodying my invention.

To a suitable support, as A, which is placed adjacent the street or crossing where the alarm is to be positioned, I secure a set of ordinary electromagnets B, which are secured to a bracket C, having the ears 1 1, through which pass the screws 2, by means of which the electromagnets B are secured to the base or panel A. Secured to this panel A at a suitable point is an ordinary battery, from one pole of which extends a wire $z$, which is led to a suitable point adjacent the track. Extending from the remaining pole of this battery 30 is a wire or conductor 31, led to a binding-post 3, which post is in electric connection with one terminal of the electromagnets B. Extending from the remaining terminal of these electromagnets B is a wire which is led to the binding-post 4, from which binding-post extends the electric conductor $x$, which is led to a suitable point adjacent the terminal $z$, so that a car or train in passing will unite these two terminals $x$ and $z$ to complete a circuit to energize the electromagnets B. Positioned adjacent these electromagnets B is a pin 5, which pin supports a hub 6, from which hub extends the armature 7, as disclosed. Secured to the hub 6, so as to be in electric connection therewith, is a binding-post 8, provided with the screw 9, and from this binding-post 8 extends the conductor 22, secured to a battery 21, from the remaining end of which battery extends the conductor 20, which conductor is secured to the binding-post 17 in connection with the electromagnets R R, forming a local circuit. These magnets R R are secured to a bracket 23 by means of the screws 2 2, and from this bracket 23 is the base-plate 15, from which extends outwardly the ear $e$, which is brought into electric connection by means of the conductor 18 with one of the poles of the electromagnets R. Extending through this ear $e$ is the set-screw 16, which works against a spring 14, forming part of the armature O, which armature in turn is supported upon the pin $c$ and at its farther end is provided with the hammer 13, adapted to strike the gong P, suitably secured to the panel A. Extending from this ear $e$ is the electric conductor $f$, which is led to the spring U, suitably secured to the panel, and this spring is adapted to rub against the under side of the friction-wheel E, provided with the hub F, which is revolubly held upon the pin D, secured to and forming a part of the base-plate W, secured to the panel A by means of suitable screws, as shown. Secured to this friction-wheel E is a gear-wheel G, which gear-wheel meshes with a pinion I, mounted upon the pin H, and secured to this pinion I is the ratchet-wheel K, as disclosed. From this it will be seen that the pinion I and ratchet K are untied, as are the friction-wheel E and the gear-wheel G.

Movably mounted upon the pin H is an arm M, and to this arm M is secured a pin 12, from which extends a pawl L, working upon the ratchet-wheel K, as shown. At its end this rocking bar M is provided with an insulated pin $a$, from which depends the arm N, secured, by means of the insulated pin $b$, to the vibrating armature O, as shown. By means of the plate W and the pins H and D the gear-wheels are in metallic circuit. The friction-wheel E is so arranged that the spring U rubs upon one side of it to form a contact, while upon the peripheral surface or edge rides the armature extension S. At suitable points this friction-wheel E is provided with the projecting insulation-points T, so that at certain points these projecting insulation-ears T come in contact with the extension S to raise and disconnect the armature from the friction-wheel E.

In securing my alarm to the track the operation would be as follows: The instrumentalities would be set as disclosed in the drawing, so that the armature extension S would be held away from the wheel E by means of one of the insulation-ears T. Upon the approach of a car or train the terminals $x$ and $z$ would be brought together to energize the magnets B, and these magnets would then promptly draw down the armature 7, in doing which the armature extension S would be drawn away from the insulation-ear T and fall upon the friction-wheel E. This would immediately create a local circuit in that a circuit would be formed by means of the conductor 22 and the train of the gearing-spring U, conductor $f$, the local magnets R, which are in connection with the local battery 21 to actuate the vibrating armature O to strike the gong P. Now the operation of the vibrating armature O will continue as long as the local magnets R are energized. The movement of the vibrating armature O would draw down the pawl-arm M to rotate the ratchet K, actuating the pinion I and so rotating the gear G and the connected friction-wheel E. This operation of the gong and the train of gearing would continue until one of the insulation-gears T would be brought below the armature extension S to raise the same to break the local circuit.

The device is simple of construction and may be readily operated, and having thus described my said invention, what I claim as new, and desire to secure by United States Letters Patent, is—

1. In an electric signal of the character described, the combination with a track mechanism, of an electromagnet in connection with said mechanism, an armature adapted to be operated when said magnets are energized, a wheel, said armature being adapted to normally ride upon an insulated ear of said wheel, a pawl adapted to actuate aforesaid wheel, a local circuit, a contact within said local circuit in engagement with said wheel, local magnets within said local circuit, a vibrating armature adjacent said local magnets, said armature being in connection with aforesaid pawl, and a gong sounded by said vibrating armature, all arranged substantially as and for the purpose set forth.

2. In an electric signal of the character described, the combination with two electric terminals, of a battery and an electromagnet in circuit with said terminals, an armature held adjacent said electromagnets, a contact-maker extending from said armature, a friction-wheel, an insulated ear secured to said friction-wheel, said contact-maker normally being in engagement with said ear to hold the same away from said friction-wheel, an electric conductor extending from said armature to a local battery, a local electromagnet in circuit with the remaining pole of said local battery, a vibrating armature placed adjacent said local magnets adapted to sound a gong, a gear-wheel secured to aforesaid friction-wheel, a pinion meshing with aforesaid gear-wheel, a ratchet-wheel secured to said pinion, a vibrating arm, a pawl secured to said vibrating arm and engaging said ratchet-wheel, an insulated bar connecting said vibrating armature to said rocking bar, and a sliding contact-maker in engagement with said friction-wheel and in circuit with said vibrating armature, all arranged substantially as and for the purpose set forth.

Signed in the presence of two witnesses.

ALBERT E. CAUGHEY.

Witnesses:
J. E. HOLLENBECK,
GEORGE W. SUES.